(12) United States Patent
Hafenrichter et al.

(10) Patent No.: US 11,186,046 B2
(45) Date of Patent: Nov. 30, 2021

(54) INDUCTION CURING OF CELL-BASED STRUCTURAL ARRAYS

(71) Applicant: The Boeing Company, Chicago, IL (US)

(72) Inventors: Joseph Lawrence Hafenrichter, Auburn, WA (US); Joseph A. Marshall, Kent, WA (US); Gary Earnest Georgeson, Tacoma, WA (US); David L. Banks, Renton, WA (US); Robert James Miller, Fall City, WA (US); Paul B. Mori, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1012 days.

(21) Appl. No.: 15/636,819

(22) Filed: Jun. 29, 2017

(65) Prior Publication Data
US 2019/0001581 A1    Jan. 3, 2019

(51) Int. Cl.
*B29C 65/36* (2006.01)
*B29C 35/08* (2006.01)
(Continued)

(52) U.S. Cl.
CPC .......... *B29C 65/3604* (2013.01); *B29C 35/08* (2013.01); *B29C 35/0805* (2013.01); *B29C 65/14* (2013.01); *B29C 65/32* (2013.01); *B29C 65/3464* (2013.01); *B29C 65/368* (2013.01); *B64C 1/12* (2013.01); *H01Q 1/286* (2013.01); *H01Q 7/00* (2013.01); *H01Q 11/08* (2013.01); *H01Q 21/0087* (2013.01); *B23K 1/002* (2013.01); *B29C 2035/0811* (2013.01);
(Continued)

(58) Field of Classification Search
CPC .............. B29C 65/3604; B29C 65/14; B29C 65/3464; B29C 65/368; B29C 35/08; B29C 35/0805; B29C 2035/0811; B29C 2031/60; B29C 2031/608; B23K 1/002; H01Q 1/286; H01Q 7/00; H01Q 21/0087; H01Q 11/08; B32B 2305/024; B32B 2310/0812; B32B 605/18; B32B 2607/00; B32B 37/06
USPC ................................... 219/633; 156/60, 305
See application file for complete search history.

(56) References Cited

U.S. PATENT DOCUMENTS 7,109,942 B2    9/2006    McCarville et al.
7,109,943 B2    9/2006    McCarville et al.
(Continued)

FOREIGN PATENT DOCUMENTS

EP    2704259 A2    3/2014
EP    2803461 A1    11/2014

OTHER PUBLICATIONS

European Patent Office Communication and Examination Report, dated Jan. 2, 2019, regarding Application No. 18168172.7, 5 pages.
(Continued)

*Primary Examiner* — Tu B Hoang
*Assistant Examiner* — Alba T Rosario-Aponte
(74) *Attorney, Agent, or Firm* — Yee & Associates, P.C.

(57) ABSTRACT

Adhesive bondlines in a cell-based structural array are thermally cured using tooling blocks inserted into the cells. The tooling blocks have embedded susceptors that are inductively heated by an alternating electromagnetic field generated by an electromagnet.

22 Claims, 11 Drawing Sheets

(51) Int. Cl.
  *H01Q 21/00* (2006.01)
  *H01Q 1/28* (2006.01)
  *H01Q 7/00* (2006.01)
  *H01Q 11/08* (2006.01)
  *B29C 65/14* (2006.01)
  *B29C 65/32* (2006.01)
  *B29C 65/34* (2006.01)
  *B64C 1/12* (2006.01)
  *B29L 31/60* (2006.01)
  *B23K 1/002* (2006.01)

(52) U.S. Cl.
  CPC ..... *B29L 2031/60* (2013.01); *B29L 2031/608* (2013.01); *B32B 2305/024* (2013.01); *B32B 2310/0812* (2013.01); *B32B 2605/18* (2013.01); *B32B 2607/00* (2013.01)

(56) References Cited

U.S. PATENT DOCUMENTS

| | | | |
|---|---|---|---|
| 8,446,330 | B1 | 5/2013 | McCarville et al. |
| 8,661,649 | B1* | 3/2014 | Urcia ................ H01Q 21/0087 29/592.1 |
| 8,912,975 | B1 | 12/2014 | Hafenrichter et al. |
| 9,059,517 | B2 | 6/2015 | Marshall, IV et al. |
| 9,242,440 | B2 | 1/2016 | Hafenrichter et al. |
| 9,515,393 | B2 | 12/2016 | Marshall, IV et al. |
| 2006/0097947 | A1* | 5/2006 | McCarville ........ H01Q 21/0087 343/797 |
| 2010/0177011 | A1 | 7/2010 | Sego et al. |
| 2013/0082047 | A1 | 4/2013 | Matsen et al. |
| 2014/0060733 | A1* | 3/2014 | Marshall, IV ...... B32B 37/1284 156/305 |
| 2014/0320366 | A1 | 10/2014 | Urcia et al. |
| 2014/0338812 | A1* | 11/2014 | Hafenrichter ...... H01Q 21/0087 156/60 |
| 2015/0020975 | A1 | 1/2015 | Matsen et al. |
| 2016/0136849 | A1 | 5/2016 | Hafenrichter et al. |

OTHER PUBLICATIONS

European Patent Office Search Report, dated Nov. 28, 2018, regarding Application No. 18168172.7, 4 pages.
China National Intellectual Property Administration, First Notification of Office Action, dated Jul. 21, 2021, regarding Application No. 201810529415.6, 19 pages.
Intellectual Property India Examination Report, dated Jul. 12, 2021, regarding application No. 201814013726, 7 pages.

* cited by examiner

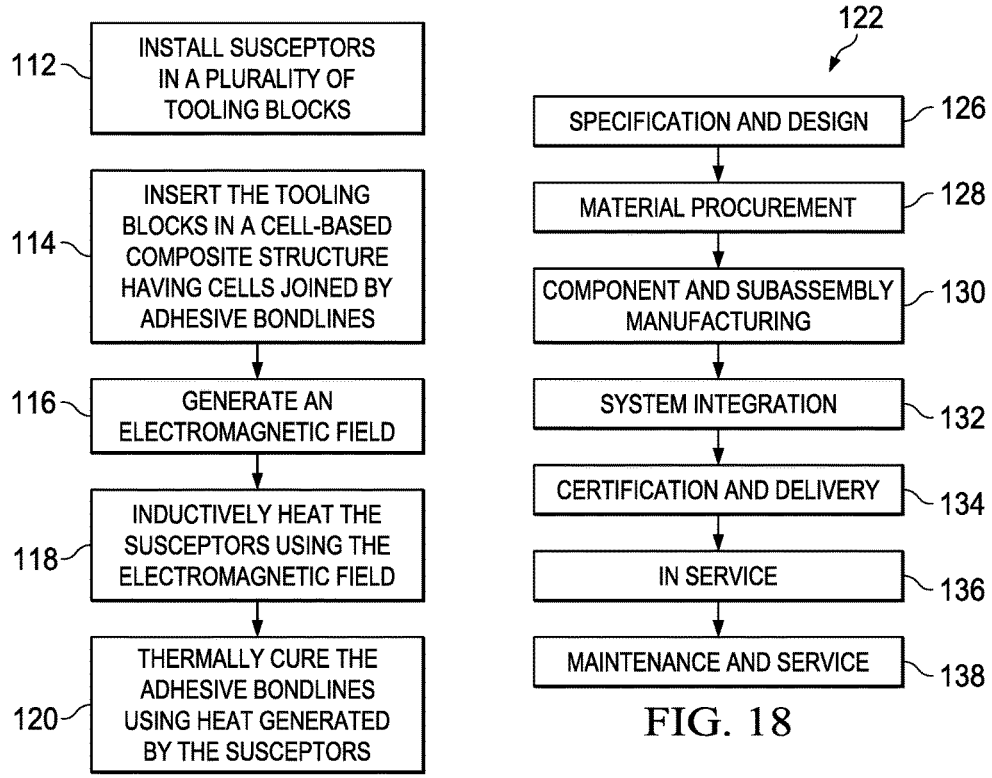
FIG. 17
FIG. 18
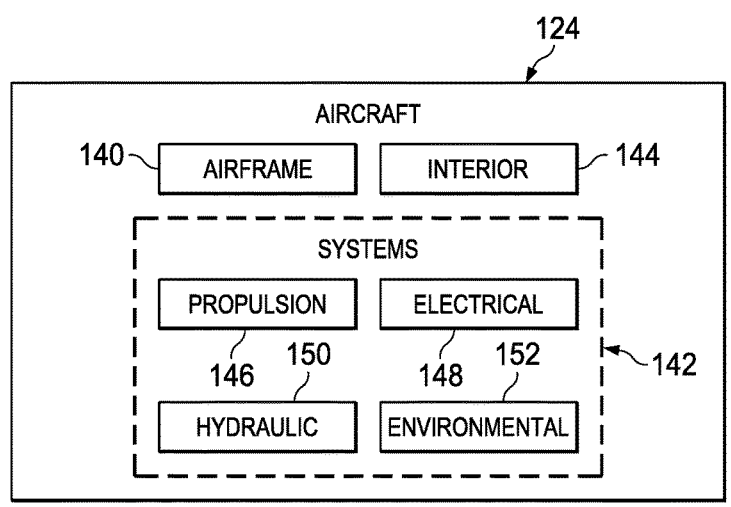
FIG. 19

INDUCTION CURING OF CELL-BASED STRUCTURAL ARRAYS

BACKGROUND INFORMATION

1. Field

The present disclosure generally relates to manufacturing and repairing of adhesively bonded cell-based structural arrays, and deals more particularly with a method and apparatus for inductively curing adhesive bondlines that join cells and skin panels together.

2. Background

Cell-based structural arrays may be used to provide composite structures with strength and rigidity, and/or to form functional features such as a structural RF (radio frequency) aperture used for transmission and/or reception of RF signals. In one application, a cell-based structural array is bonded between inner and outer facesheets to form a sandwich structure. The array comprises individual hollow cells formed by cell walls that are adhesively joined together along bondlines. After the adhesive is applied, a bank of tooling blocks is inserted into the cells of the array, and the array along with the tooling blocks are placed in an oven or autoclave for thermal curing.

The curing technique described above relies on convection heat sources which may not evenly convect heat across the dense bank of tooling blocks. This uneven convection heating is due in part to thermal gradients caused by the relatively high thermal mass of the tooling blocks. Uneven convection heating may result tooling blocks in interior regions of the array heating up more slowly than those in the exterior regions. This is because heat cannot be easily transmitted across the cells of array or into the depths of the individual cells. The relatively large temperature gradients over the dense array of tooling blocks have the potential to create an under-cure or over-cure of the adhesive bondlines. Extending the cure cycle does not fully address uneven heating conditions and adds to manufacturing time and equipment costs. Under-cure or over-cure conditions of the adhesive bondlines can ultimately result in scrap or rework and drive up manufacturing and repair costs.

SUMMARY

The disclosure relates in general to processes and equipment for manufacturing composite sandwich structures having cell-based cores, and more specifically to a method and apparatus for curing adhesive bondlines that attach the cells to each other and to the face sheets of the structure. Uniform heating of the adhesive is achieved throughout the array using cell tooling blocks having embedded magnetic susceptors. Induction heating of the tooling blocks is achieved by subjecting the susceptors to an electromagnetic field produced by an induction coil powered by a high-frequency alternating (AC) power source. Internal heating of the tooling blocks by the susceptors results in highly controllable, uniform heating of the cells throughout the cell array, regardless of their position in the array, including interior and exterior cells, as well as uniform heating throughout each of the cells. The electromagnetic field can be selectively oriented to reduce or eliminate undesired rogue heating of thermally sensitive components within the cells, such as antenna elements. Various configurations of embedded susceptor elements are possible that allow targeted heating of local areas of the cells.

According to one aspect, apparatus is provided for use in heating at least one cell in a cell-based composite structure. The apparatus comprises a tooling block configured to be inserted into the cell. The tooling block includes at least one susceptor responsive to electromagnetic energy from a source thereof for heating at least a portion of the cell.

According to another aspect, apparatus is provided for thermally curing a composite structure having an array of composite cells formed by cell walls joined together by adhesive bondlines. The apparatus comprises a bank of tooling blocks configured to be respectively inserted into the cells for thermally curing the adhesive bondlines. Each of the tooling blocks includes a tool body and a susceptor embedded within the tool body. The susceptor is formed of a conductive material capable of converting electromagnetic energy into heat.

According to a further aspect, a method is provided of curing adhesive bondlines within cells of a cell-based composite structure. The method comprises installing a susceptor in each of a plurality of tooling blocks, and inserting the tooling blocks respectively in the cells of a cell-based composite structure. The method also includes generating an electromagnetic field, inductively heating the susceptors using the electromagnetic neck field, and thermally curing the adhesive bondlines using heated susceptors.

One of the advantages of the induction heating method is that uniform heating across an entire bank of cells can be achieved relatively quickly and easily without temperature gradients across the array. Another advantage is that uniform heating throughout individual cells can be achieved, thereby avoiding under-cure or over-cure of the adhesive. A further advantage is that only local portions or targeted areas of the cells can be heated if desired, thus avoiding overheating of other areas of the cells where heat sensitive components may be located. A still further advantage is that the use of induction heating to thermally cure the structure consumes less energy than other types of heating such as convection heating, and is easily implemented at low cost. A further advantage is that the use of inductively heated susceptor material prevents over heating of the cells because the susceptor materials cannot heat beyond their curie temperature. Other advantages are that the induction heating process is rapid, highly controllable, very uniform, highly self-correcting and easily scalable.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 17 is an illustration of a flow diagram of a method of induction curing a cell-based structural array.

FIG. 18 is an illustration of a flow diagram of aircraft production and service methodology.

FIG. 19 is an illustration of a block diagram of an aircraft.

DETAILED DESCRIPTION

The disclosed embodiments may be employed to fabricate or repair of composite structures that incorporate a cell-based structural array, sometimes referred to as a cell-based sandwich structure, in which a structural array of cells is sandwiched between two facesheets. These cell-based structural arrays can be used to transfer loads, or for other purposes.

Figure 1:
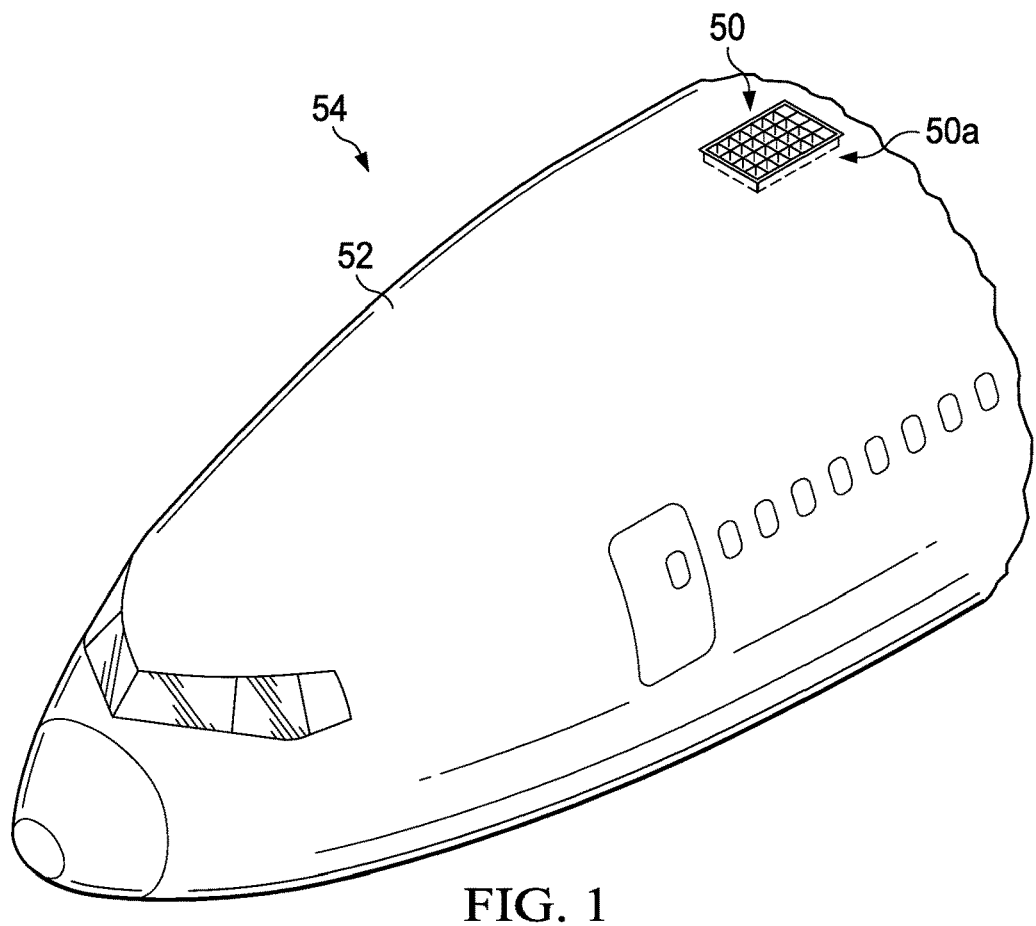
FIG. 1 is an illustration of a perspective view of a front portion of an aircraft fuselage.
Figure 2:
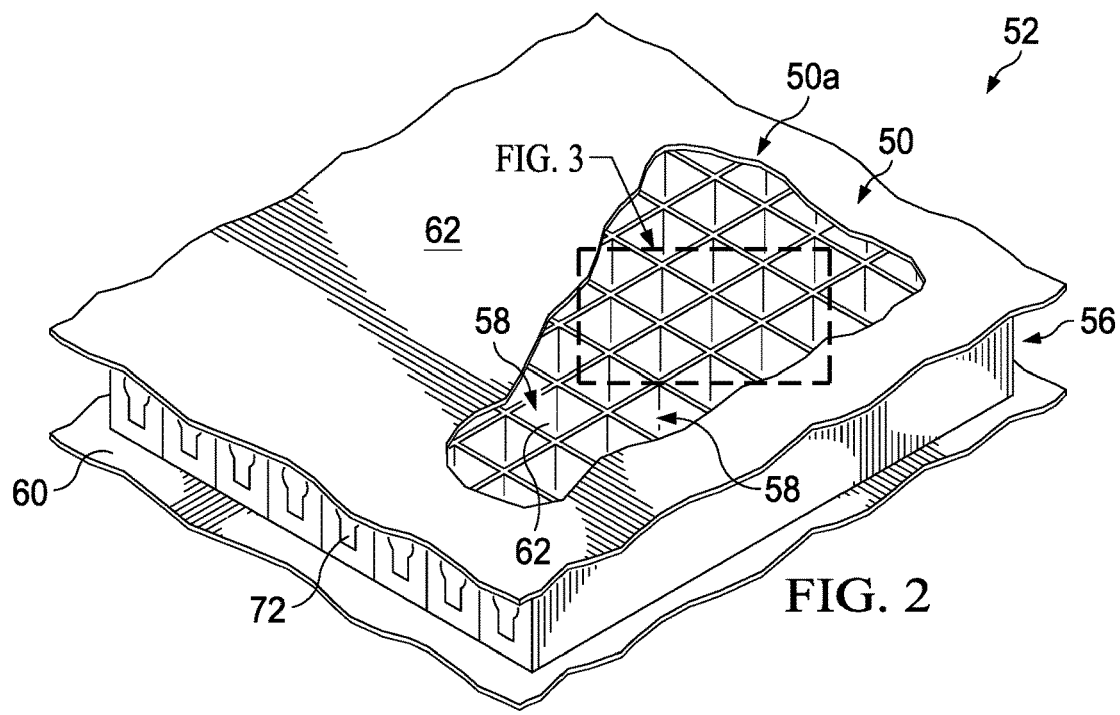
FIG. 2 is an illustration of a perspective view of a portion of a cell-based structural array forming an RF aperture in the aircraft fuselage shown in FIG. 1.

Referring to FIG. 1, one example of a cell-based structural array 50 is an RF (radio frequency) structural aperture 50a that is used for communication and is integrated into the skin 52 of an aircraft fuselage 54. As shown in FIG. 2, the RF structural aperture 50a comprises an array 56 of cells 58 sandwiched between inner and outer facesheets 60, 62 to form a composite sandwich structure. Although the structural RF aperture 50a is shown as being located in the aircraft fuselage 54, it may be located in other areas of the aircraft, including but not limited to wings, cowls, stabilizers, doors, etc. Moreover, although an aircraft application is illustrated, the cell-based structural array 50 may be incorporated into structures used in other applications, such as, for example and without limitation, land or sea vehicles, spacecraft, satellites, etc.

Figure 3:
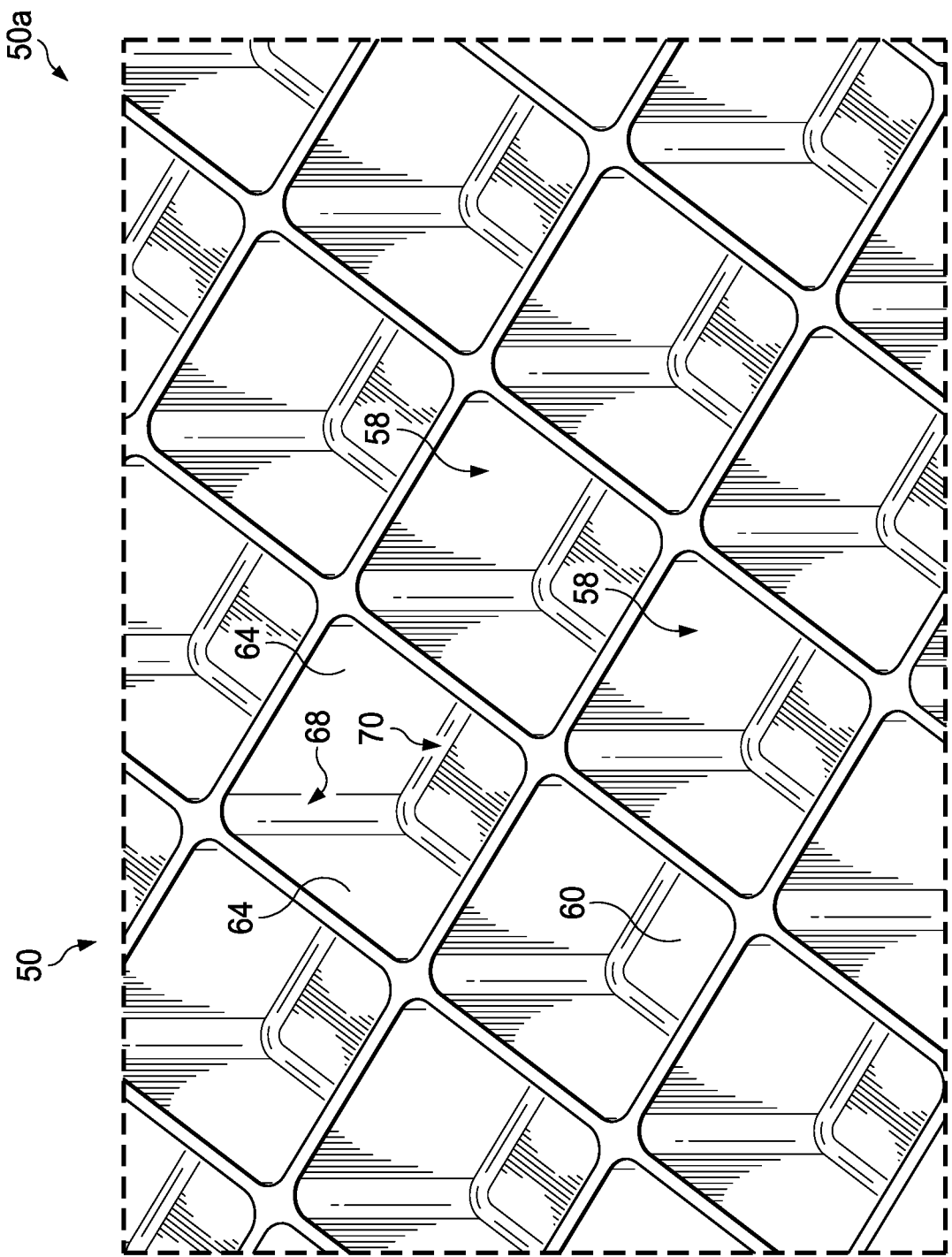
FIG. 3 is an illustration of a perspective view of the area designated as "FIG. 3" in FIG. 2.

Referring also to FIG. 3, the cells 58 are formed by walls 64 that are joined together along their mutual edges by a suitable resin bonding adhesive that form adhesive fillets or vertical bondlines 68. The walls 64 are also joined to the inner facesheet 60 and/or to RF antenna elements 72 (FIG. 2) by bonding adhesive forming adhesive fillets or horizontal bondlines 70. Each of the cells 58 may include one of the RF antenna elements 72 that is adapted to receive and/or transmit RF communication signals. In the illustrated example, the cells 58 have a substantially rectangular cross-section, however other cross-sectional cell shapes are possible. The structural RF aperture 50a shown in FIGS. 1-3 is merely illustrative of a wide range of cell-based structural arrays that may be fabricated and/or repaired using the method and apparatus described below in greater detail.

Figure 4:
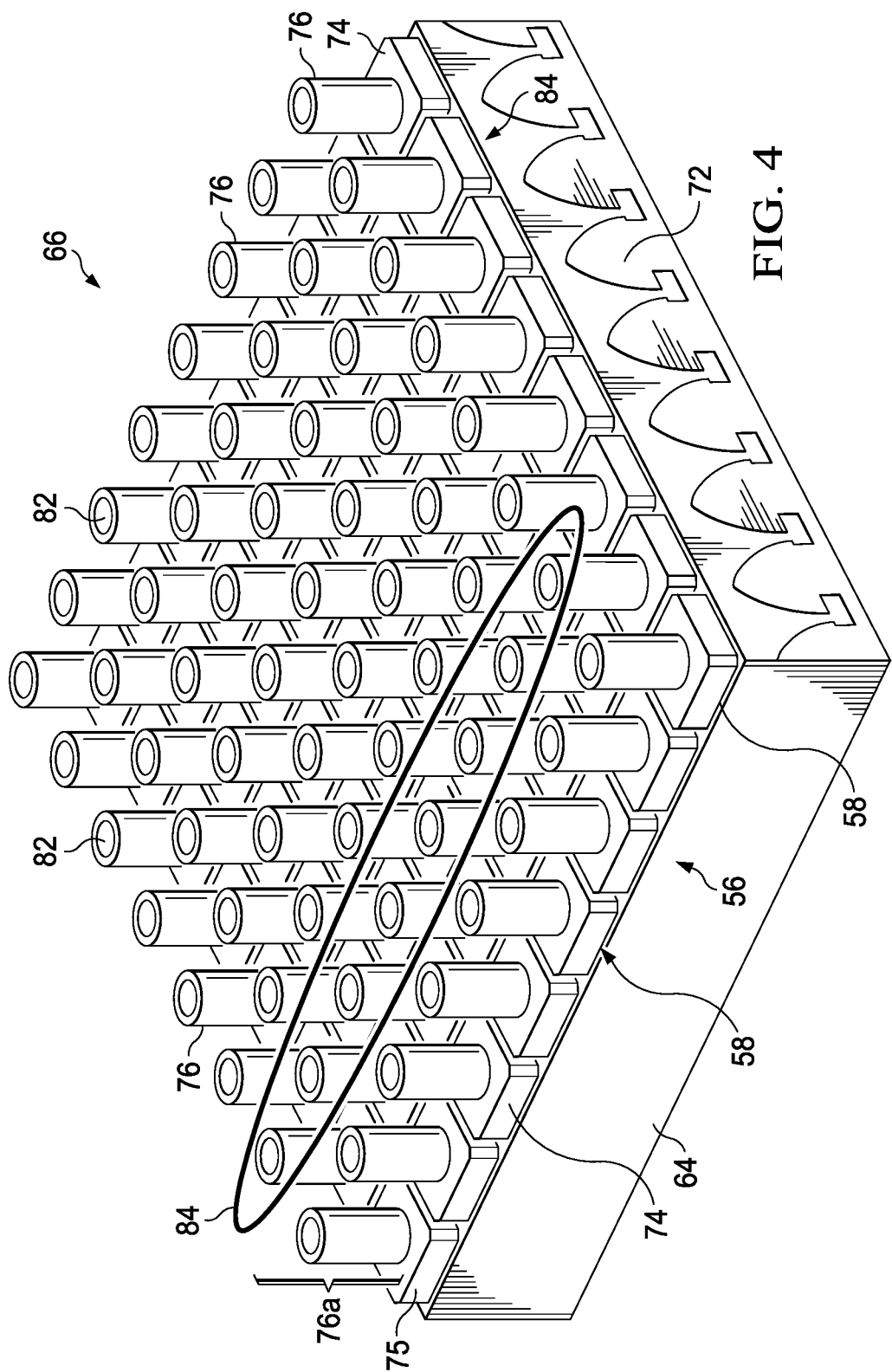
FIG. 4 is an illustration of a perspective view of a bank of tooling blocks inserted in the cells of a cell-based structural array.
Figure 5:
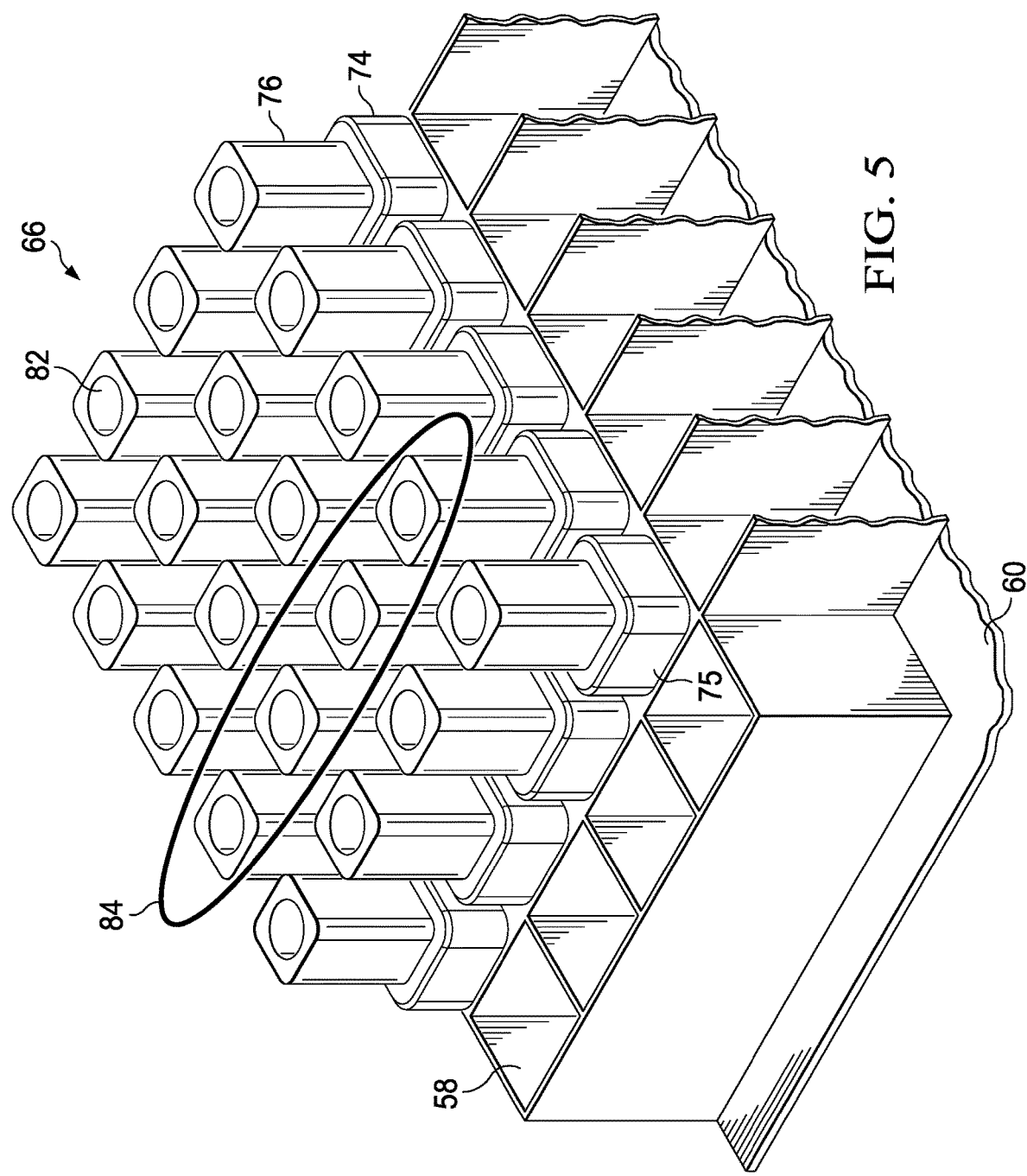
FIG. 5 is an illustration of a portion of a cell-based structural array in which several tooling blocks with susceptors have been inserted, several of the cells not yet filled with tooling blocks.

During fabrication and/or rework of a cell-based structural array 50 it may be necessary to thermally cure the walls 64 and/or the bonding adhesive forming the bondlines 68, 70. Referring now to FIGS. 4 and 5, the cell-based structural array 50 may be thermally cured using a bank 66 of tooling blocks 74, each of which is inserted into one of the cells 58 and has a shape that is the negative of the cell 58. Each of the tooling blocks 74 includes a tool body 75 having an embedded, thermally conductive, magnetic susceptor 76 that generates heat. As will become apparent below, the susceptor 76 may comprise a single susceptor element or multiple susceptor elements. As used herein, "embedded" refers to the susceptor 76 being incorporated within, surrounded by, attached to or mounted on the tool body 75.

Internal heating of each tooling block 74 by a susceptor 76 results in uniform cell heating regardless of the position of the cell within the array 56. The heat generated internally in the susceptor 76 is conducted through the tool body 75 to the surrounding cell walls 64 and to the adhesive bondlines 68, 70. The tooling blocks 74 may be ganged, i.e. tightly grouped together, within the bank 66 and in the illustrated example are arranged in linearly aligned rows 84 thereof. The rows 84 can be closely spaced from each other. In this example, the rows 84 of tooling blocks 74 within the bank 66 are aligned with each other, however in other examples they may be staggered relative to each other. The tooling blocks 74 are aligned to match the configuration of the cells 58.

The tool body 75 can be formed of a low friction material such as PTFE (Polytetrafluoroethylene), however other materials are possible, providing that they do not block electromagnetic fields. The tool body 75 may also be formed of other rigid or semi-rigid materials, including metal, that is coated with a layer of low friction material that allows the tool block 74 to slide into easily and out of the cells 58. The susceptors 76 are formed of a thermally conductive metal such as aluminum, steel, carbon, iron, copper or a metal alloy, capable of absorbing electromagnetic energy and converting it into heat. As will be described below in more detail, the heat generated within the susceptors 76 is used to thermally cure the adhesive bondlines 68, 70 and/or other features of the cells 58. In order to control the maximum temperature to which the tooling blocks 74 are heated, the susceptors 76 may be formed of conductive materials that are also magnetic. For example, the susceptors 76 may be formed of ferromagnetic materials such as alloys of iron (Fe), nickel (Ni) or cobalt (Co), or ferrimagnetic materials such as, without limitation, ferrites. In the case of susceptors 76 that are formed of magnetic materials, a susceptor material is chosen that has a Curie temperature close to but slightly higher than the cure temperature of the bondline adhesive. When using magnetic susceptors, the heat produced by the susceptor 76 decreases as the temperature increases to the Curie temperature, thereby preventing overheating of the cells 58 while ensuring proper cure of the adhesive bondline at its cure temperature.

Each of the tool bodies 75 has a cross-sectional shape substantially matching that of cells 58 and is in substantially face-to-face contact with the surrounding walls 64, the inner facesheet 60 and the adhesive bondlines 68, 70. In the example shown in FIG. 4, the susceptors 76 are round tubes having a hollow center 82 and a circular cross-sectional shape, while the susceptors 76 in the example shown in FIG. 5 are square tubes 102 that are also hollow but have a substantially square cross-sectional shape. Each of the susceptors 76 shown in FIGS. 4 and 5 comprises a single susceptor element (tubes 98 and 102) that is centrally located within, and extends the entire height of the tooling blocks 74, causing the heat generated within the susceptor 76 to be evenly distributed throughout the cell 58. In the examples shown in FIGS. 4 and 5, the susceptors 76 include an exposed portion 76a that extends above the respective tool bodies 75, but in other examples described later, the tool bodies 75 may extend above the susceptors 76.

As will be discussed below in more detail, the susceptors 76 may have other shapes and may comprise more than a single susceptor element. The efficiency of a susceptor 76 is dependent upon its shape, and its orientation relative to the electromagnetic field 90. Generally, the outer extremities of an elongate, magnetic susceptor 76 of the type shown in FIGS. 4, 5 and 6 do not magnetize due to surface effects referred to as shape demagnetization. Susceptors 76 that have their long dimension parallel to the direction of the electromagnetic field 90 are least affected by the demagnetization. Conversely, susceptors 76 that have their short dimension oriented parallel to the electromagnetic field 90 are most affected by the demagnetization.

Figure 6:
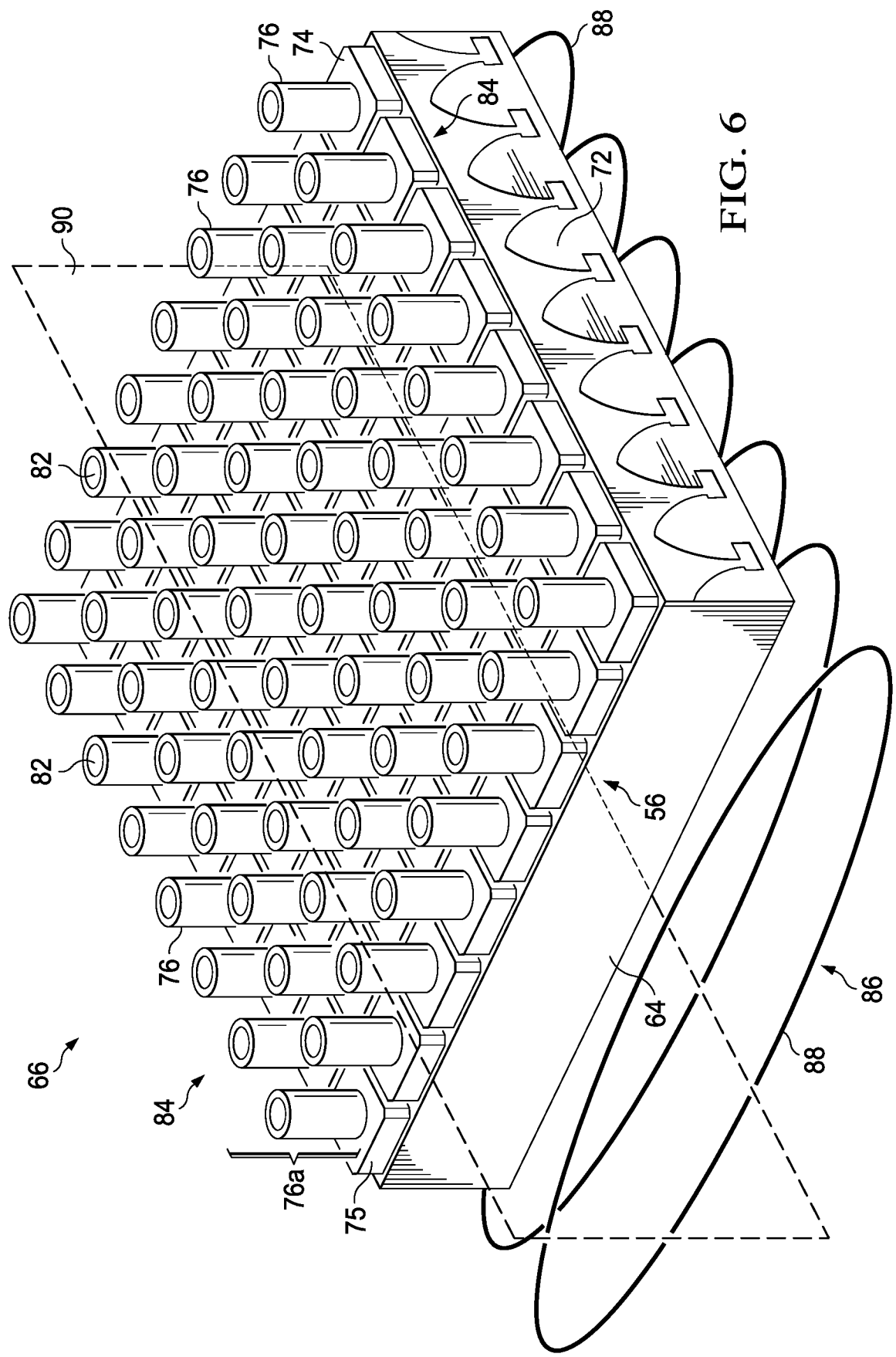
FIG. 6 is an illustration of a perspective view of the cell-based structural array shown in FIG. 4, illustrating the orientation of an induction coil and a related electromagnetic field.
Figure 7:
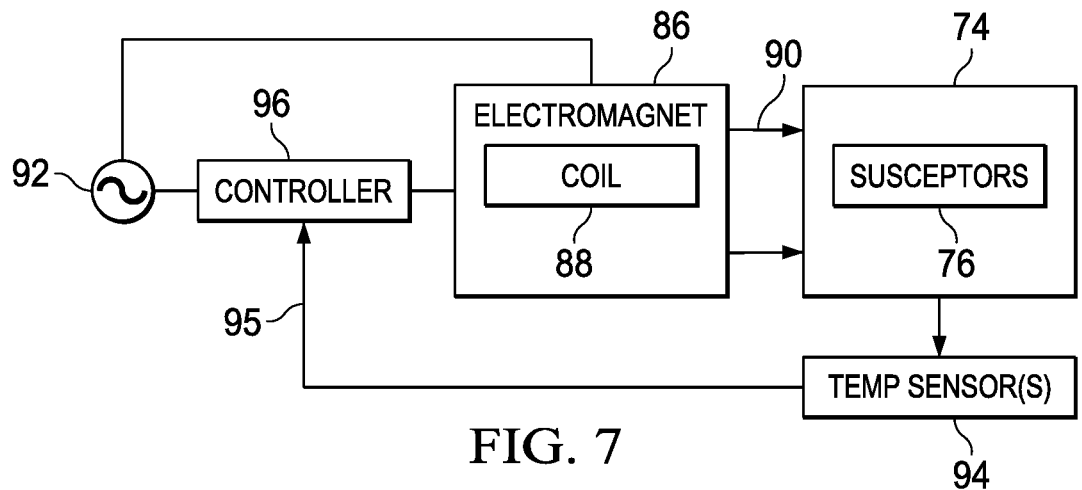
FIG. 7 is an illustration of a functional block diagram of an apparatus for inductively curing of a cell-based structural array.

Referring now to FIGS. 6 and 7, an electromagnet 86 includes at least one induction coil 88 powered by a source of high frequency AC (alternating current) 92 controlled by a controller 96. Excitation of the induction coil 88 by the high frequency AC source 92 produces an electromagnetic field 90. The induction coil 88 is oriented such that the electromagnetic field 90 extends normal (perpendicular) to the rows 84 of ganged tooling blocks 74. The electromagnetic field 90 induces the flow of electrical currents in the susceptors 76. These electrical currents include Eddy currents that flow through the susceptors 76 and cause internal joule heating of the susceptors 76 throughout the array 56. In the case of susceptors 76 formed of ferromagnetic or ferrimagnetic materials, the induced currents include hysteresis currents generated by magnetic hysteresis losses. These currents are induced equally in all of the susceptors 76 because all of the susceptors are subjected to the same electromagnetic field 90. As a result of these internal currents, all of the cells 58 of the array 56 are heated evenly and quickly at the same rate. This even and uniform heating of the cells 58, including the bondlines 68, 70, reduces or eliminates over-curing or under-curing of the adhesive bondlines 68, 70. Moreover as mentioned above, heating of the cells 58 internally by the susceptors 76 allows even, uniform heating within the individual cells 58. When tightly ganged together, the heat generated within each of the tooling blocks 74 does not affect the adjacent tooling blocks 74, because they heat independently of each other and at the same rate. The use of magnetic susceptors 76 provides self-regulation of the temperature since the susceptors 76 heat up to, but do not exceed, their Curie temperature.

In some applications, the array 56 of cells 58 may include certain components such as the RF antenna elements 72, that may be subject to damage caused by undesired "rogue heating" when subjected to the magnetic field 90. This rogue heating can be avoided by orienting the induction coil 88 such that it is aligned substantially perpendicular to the heat sensitive components. For example in the illustrated application, the induction coil 88 is oriented perpendicular to the RF antenna elements 72, and parallel to the rows 84 of tooling blocks 74 that are to be heated. In the example shown in FIG. 6, the induction coil 88 is located beneath the cell-based structural array 50, however in other examples it may be located above the array 50. In either of these examples, the distance between the induction coil 88 and the tooling blocks 74 is such that the susceptors 76 are located within and therefore magnetically coupled with, the electromagnetic field 90. The efficiency of the susceptors 76 increases with decreasing distance thereof from the induction coil 88 because they absorb a greater amount of energy from the electromagnetic field 90, allowing them to generate more heat. In still other examples, the structural array 50 with the installed tooling blocks 74 may be positioned in the center of the electromagnetic field 90. Centering the structural array 50 within the electromagnetic field 90 in this manner may increase the uniformity of the portion of the field that is coupled with the susceptors 76.

In some applications it may be necessary or desirable to employ two of the induction coils 88 that are oriented perpendicular to each other. One of the two induction coils 88 is oriented to produce an electromagnetic field 90 that is normal to the rows 84 of tooling blocks 74 and the other induction coil 88 oriented to produce an electromagnetic field 90 that is parallel to the rows 84. The two induction coils 88, which are oriented perpendicular to each other, can be alternately energized in order to heat adjacent walls of the cells 58.

Depending on the application, one or more temperature sensors 94 may be incorporated in or located near the tooling blocks 74 in order to sense the temperature of the tooling blocks 74 and detect whether desired temperatures are being achieved. The temperature sensors 94 send signals representing the measured temperature to the controller 96 in a feedback loop 95, allowing the controller 96 to adjust the electrical power applied to the induction coil 88, thereby controlling the electromagnetic field intensity to achieve uniform regulation of cell adhesive temperature throughout the entire cell-based structural array 50. This temperature control may be particularly useful where the susceptors 76 are not formed of magnetic materials that provide self-regulation of their temperature, and therefore and have the potential to overheat.

Figures 8, 9:
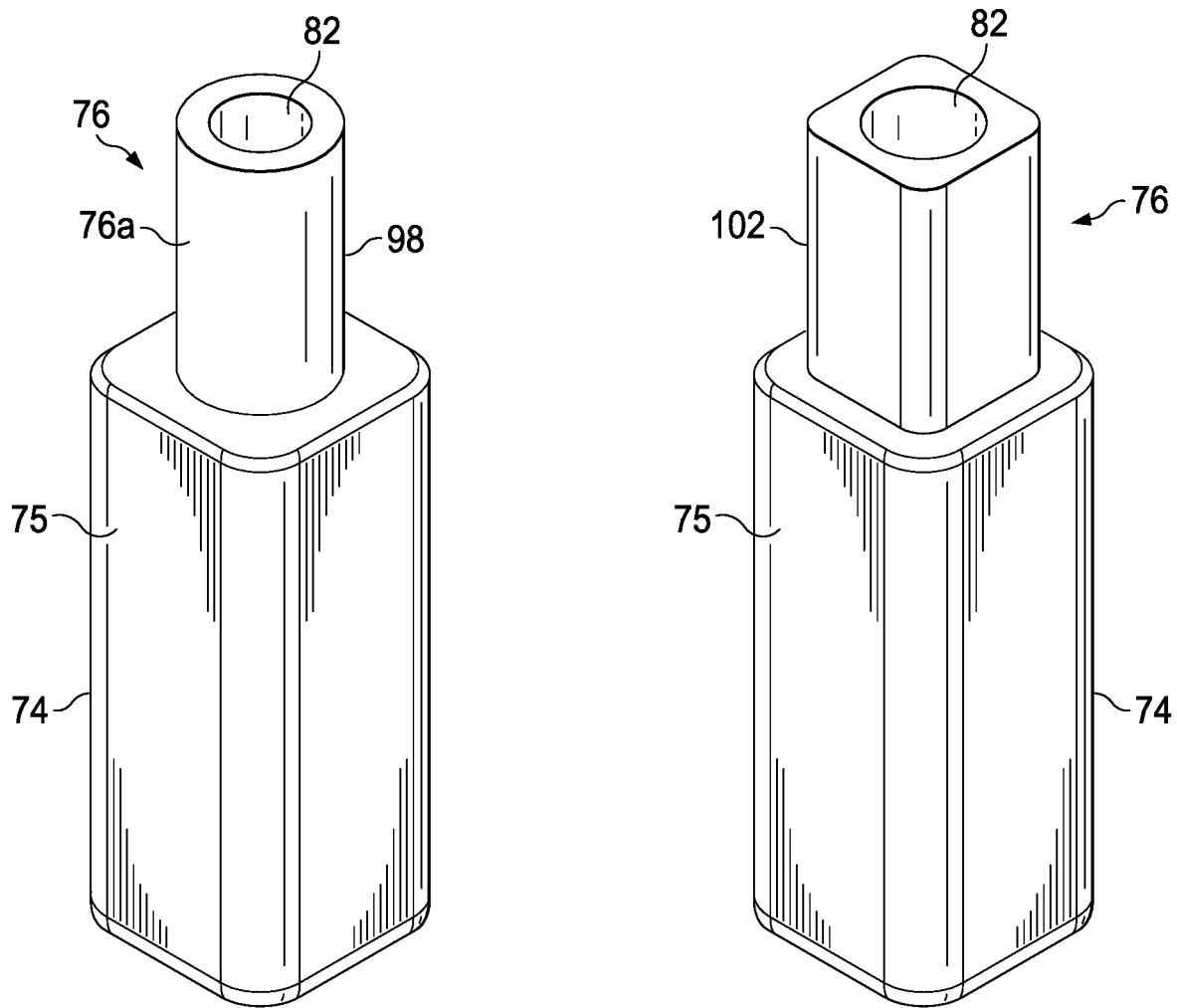
FIG. 8 is an illustration of a perspective view of one example of a tooling block having one form of a tubular susceptor.
FIG. 9 is an illustration of a perspective view of another example of a tooling block having another form of a tubular susceptor.

FIG. 8 illustrates additional details of one example of a tooling block 74 of the type shown in FIG. 6. The tooling block 74 includes a tool body 75 having a cross-sectional shape substantially matching that of the cells 58. The tool body 75 may be formed of any suitable material capable of allowing the heat generated by a centrally located susceptor 76 to be conducted to the surrounding features of the cells 58, including the adhesive bondlines 68, 70. The centrally located round tube 98 forming the susceptor 76 may be formed of any suitable conductive metal capable of being magnetically coupled with the induction coil 88. The round tube 98 has a hollow center 82 that functions to increase its magnetic susceptibility. The hollow center 82 also aids in more uniformly distributing the heat generated within the susceptor 76. In the illustrated example, the round tube 98 has an exposed upper portion 76a that extends above the top of the tool body 75. The exposed upper portion 76a facilitates insertion of the susceptor 76 into the tool body 75 as well as insertion and subsequent removal of the tooling blocks 74 from the cells 58. In other examples, however, the top of the tube 98 may be flush with, or be recessed beneath the top of the tooling block 74.

FIG. 9 illustrates another example of a tooling block 74 of the type shown in FIG. 5. The centrally located susceptor 76 comprises a square tube 102 having a cross-sectional shape that is substantially square and has a hollow center 82.

Figure 10:
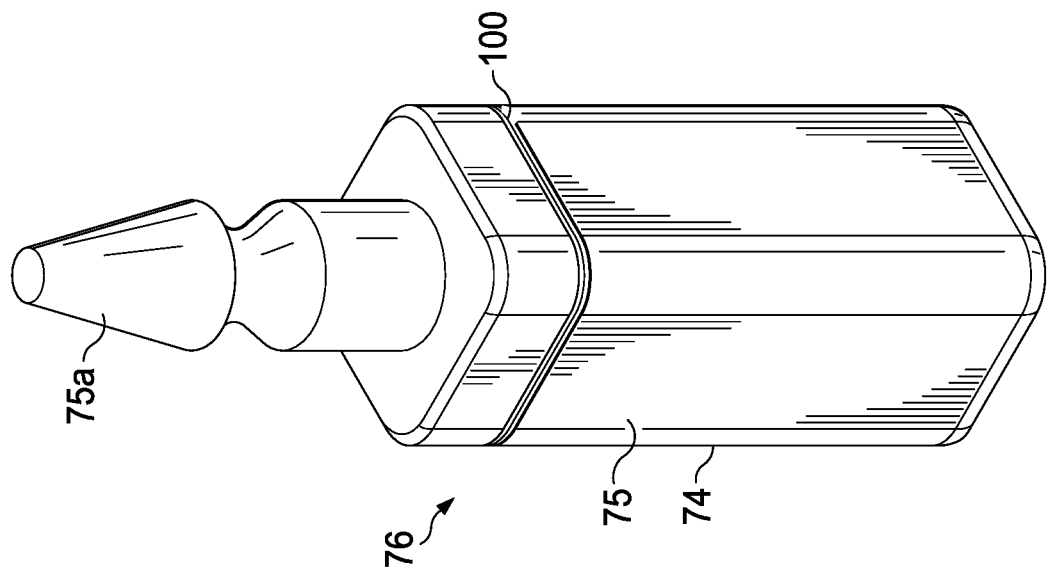
FIG. 10 is an illustration of a perspective view of another example of a tooling block having a single wire susceptor wrapped therearound.

FIG. 10 illustrates a further example of a tooling block 74 provided having an embedded susceptor 76 in the form of a one conductive wire ring 100 that is wrapped around and recessed within the outer peripheral surface of the tool body 75. In this example, the tool body 75 includes an upper extension 75a that is configured to facilitate installation and removal of the tooling blocks 74 from the cells 58, either by hand or using gripping/transfer fixtures.

Figure 11:
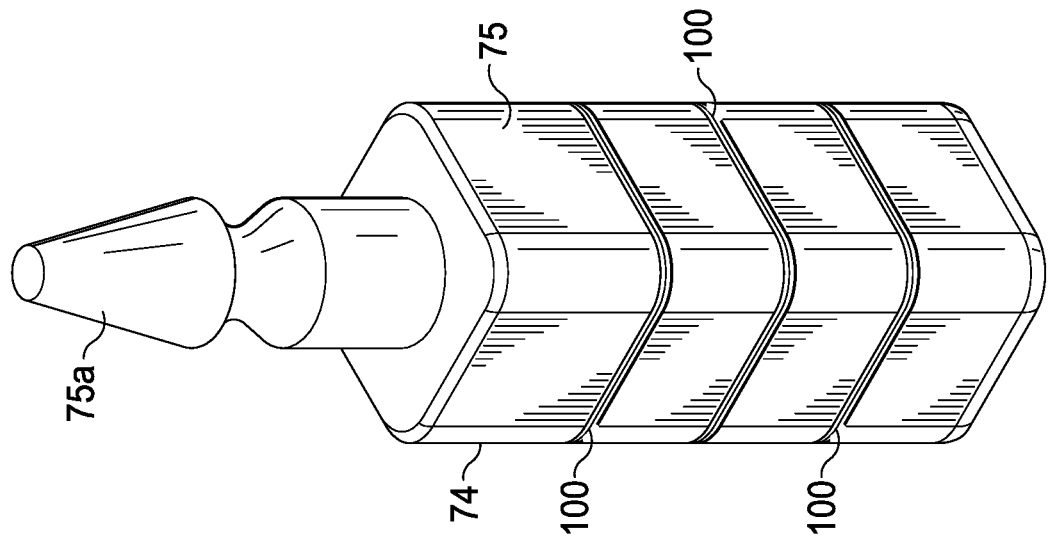
FIG. 11 is an illustration similar to FIG. 10 but wherein the tooling block has multiple wire susceptors wrapped therearound.

FIG. 11 illustrates another example of a tooling block 74, similar to that shown in FIG. 10, but wherein the tool body 75 is provided with a plurality of embedded, spaced apart wire rings 100 that function as susceptors 76 that are distributed along the height of the tool body 75. While three wire rings 100 are shown, the tool body 75 may be provided with any number of the wire rings 100. In the example shown in FIG. 10, the single wire ring 100 located near the top of the tool body 75 primarily heats only the upper regions of a cell 58, while in the example of FIG. 11, the use of multiple wire rings 100 distributed throughout the height of the tool body 75 results in substantially uniform heating of the entire cell 58. In still another example (not shown), a single wire ring 100 may be spirally wound around the tool body 75 along its length.

Figure 12:
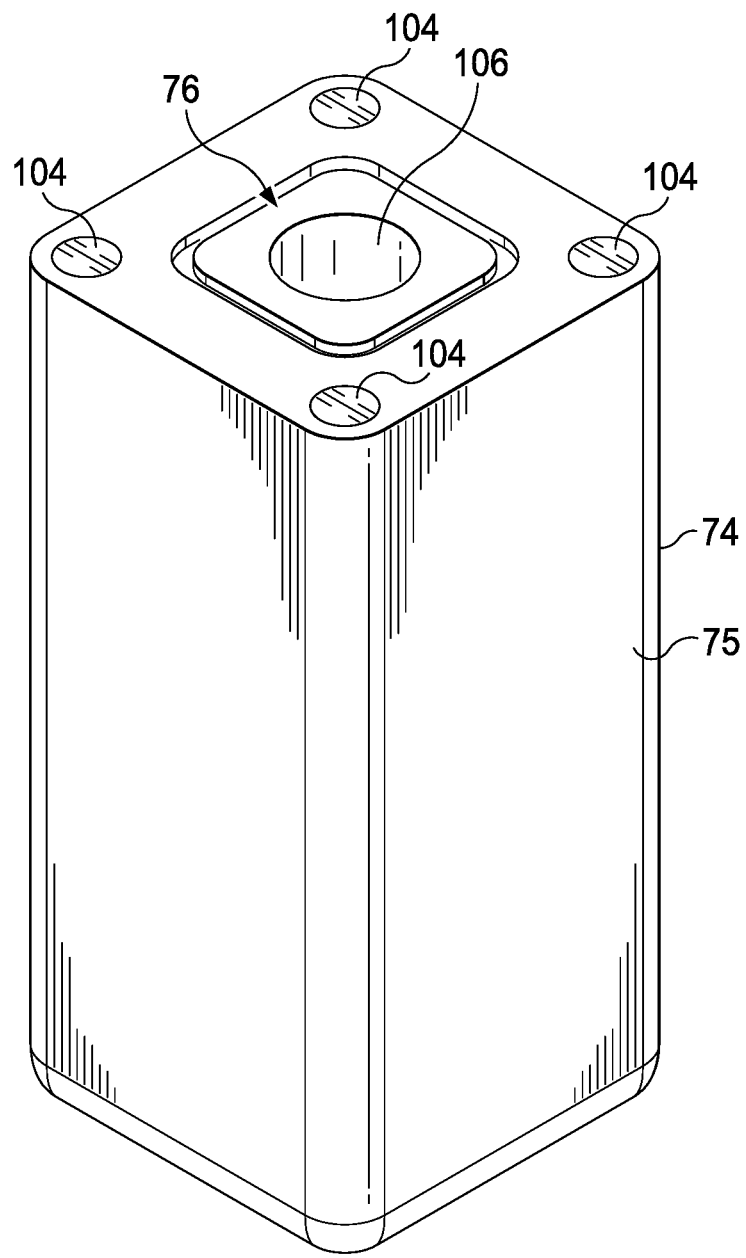
FIG. 12 is an illustration of a further example of a tooling block having a centrally located susceptor, and rod susceptors at each corner thereof.

Attention is now directed to FIG. 12 which illustrates still another example of the tooling block 74. In this example, the tool body 75 has a central through hole 106, and a susceptor 76 in the form of conductive metal elements such as rods 104 passing longitudinally through the tool block 74 at each corner thereof. By positioning the rods 104 at each corner of the tool body 75, the heat generated by the susceptors 76 is locally targeted and distributed along the adhesive vertical bondlines 68. The efficiency of the rods 104 in generating heat may be increased by connecting the rods 104 in loops with two sides in-line with the electromagnetic field 90. Similarly, although not shown in the drawings, additional susceptors 76 may be embedded within other areas of the tool body 75 in order to locally direct heat to other features of the cells 58. When using susceptors 76 having the configuration shown in FIG. 12, the coil 88 should be oriented such that the electromagnetic field 90 extends parallel to the long dimension of the rods 104. Thus, when using the susceptors 76 of FIG. 12 in the structural array 50 shown in FIG. 6, the coil 88 should be oriented such that it produces an electromagnetic field 90 having vertical orientation relative to the structural array 50.

Figure 14:
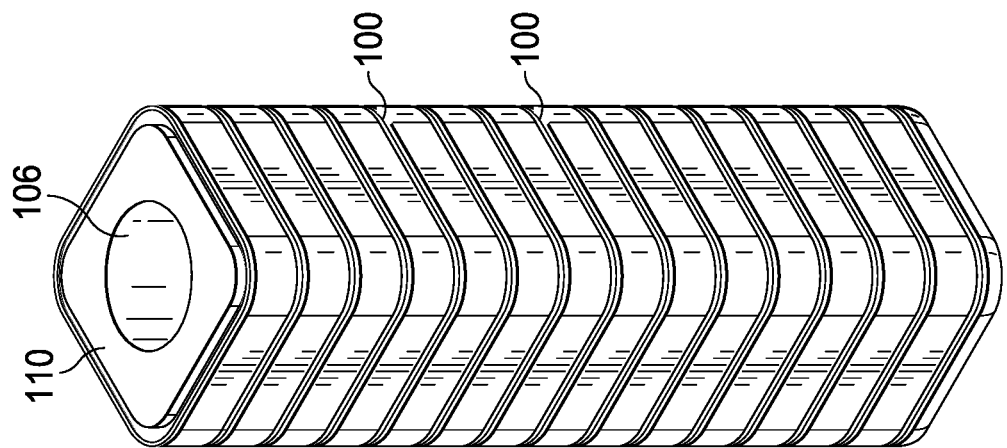
FIGS. 13-16 are illustrations of perspective views showing the sequential steps of a method of manufacturing still another example of the tooling block.
Figure 13:
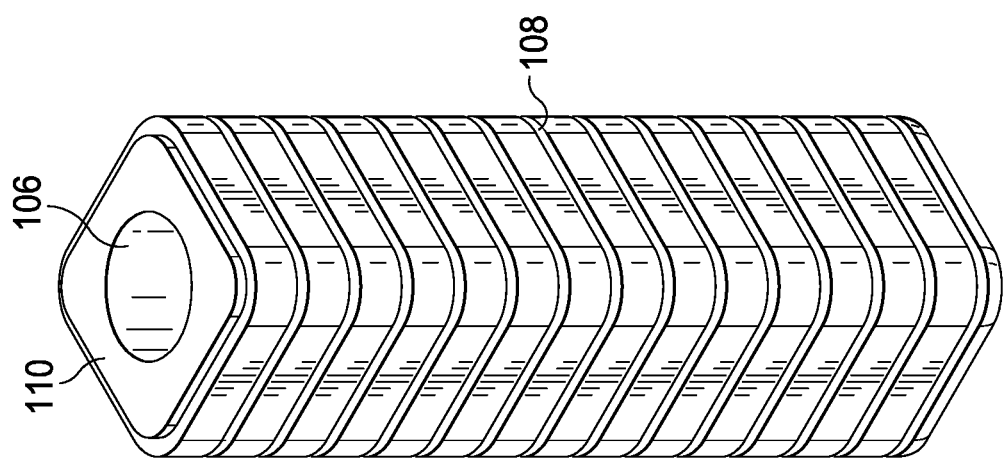

Attention is now directed to FIGS. 13-16 which illustrate the sequential steps in producing a further example of the tooling block 74. Referring to FIG. 13, a central tool body core 110 is produced that has a rectangular cross-sectional shape, a central through hole 106, and a plurality of longitudinally spaced apart, continuous grooves or recesses 108 in and around its outer surface. The tool body core 110 may be formed of any suitable material such as PEEK (polyether ether ketone) or PEK (polyetherketone), and may be produced by any of several manufacturing processes such as molding, machining, or additive manufacturing. For example, the tool body core 110, including the grooves 108 may be formed layer-by-layer by an additive manufacturing process such as FDM (fused deposition modeling) or other known 3D printing techniques. Next, as shown in FIG. 14, wire rings 100, which function as susceptors 76, are installed respectively within the grooves 108. In those examples where the tool body core 110 is produced by additive manufacturing, it may be possible to form the wire rings 100 layer-by-layer by the additive manufacturing process used to produce the tool body core 110.

Figure 16:
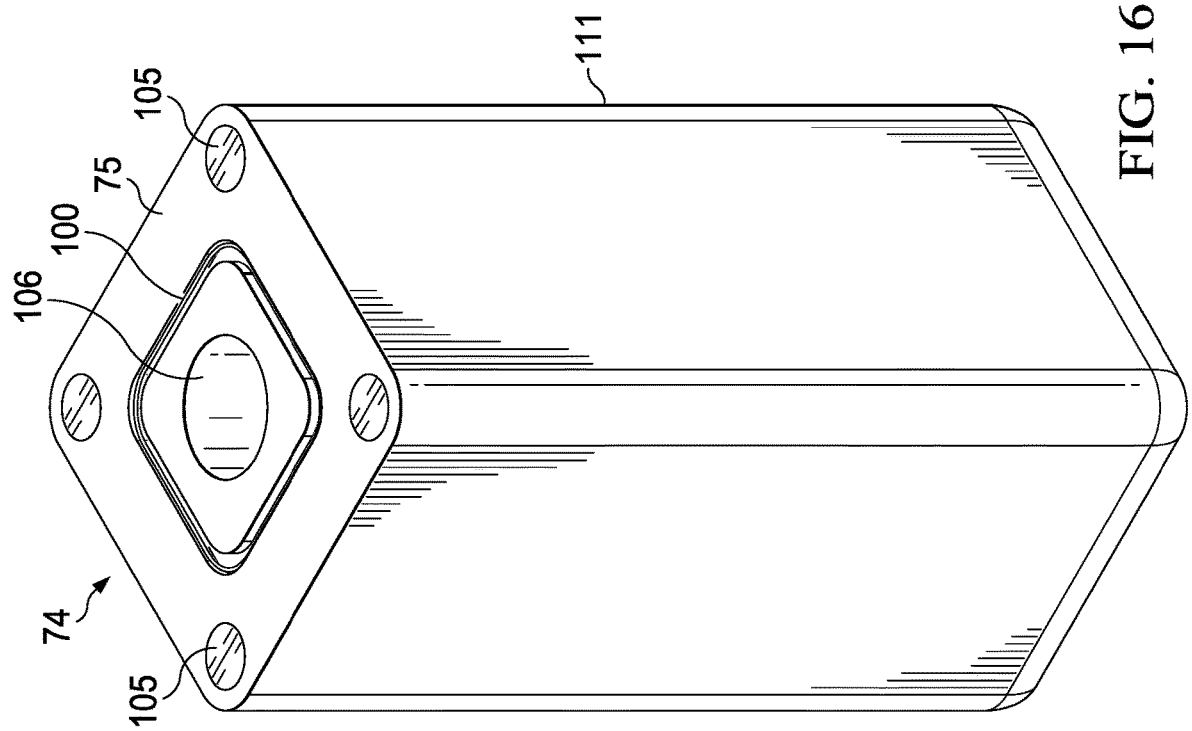
Figure 15:
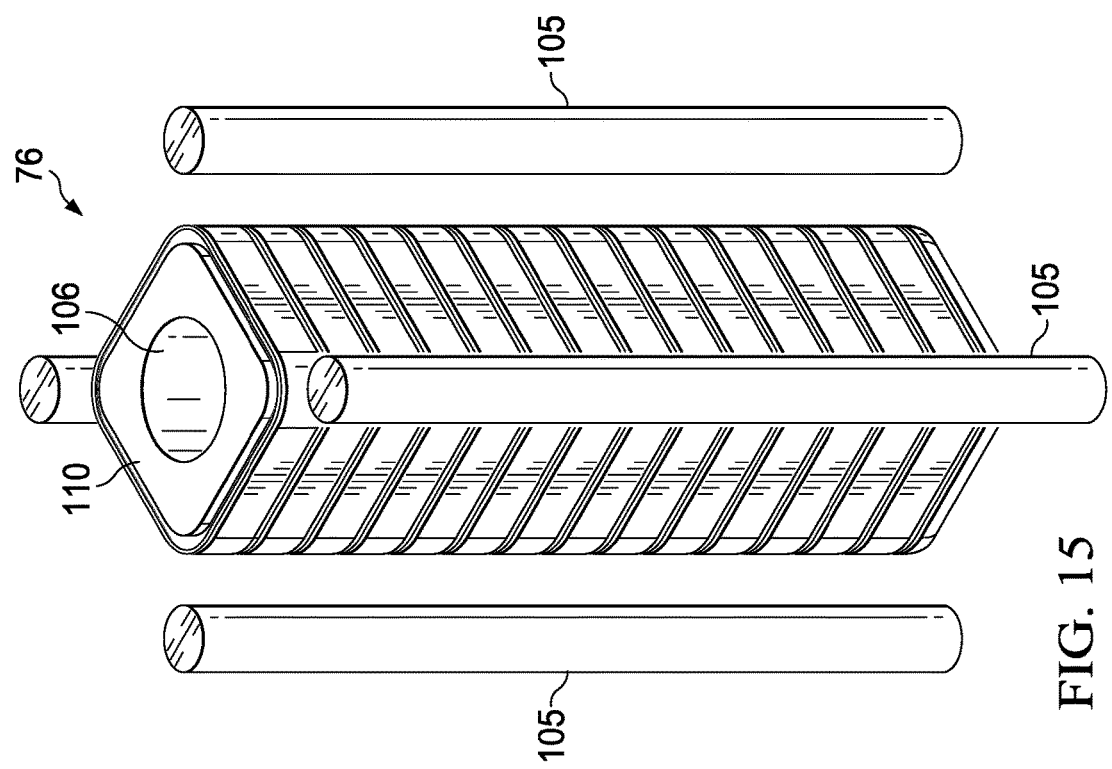

Referring to FIG. 15, heat pipes 105 comprising thermally conductive metal rods are positioned diagonally across and spaced outwardly from the corners of the tool body core 110. Next, as shown in FIG. 16, a tool body outer shell 111 is installed around the tool body core 110 and the heat pipes 105. The tool body shell 111 is formed of a suitable material such as PTFE and can be produced by machining, molding or additive manufacturing techniques, following which the tool body core 110 and the heat pipes 105 are inserted into the tool body shell 111. Alternatively, the tool body outer shell 111 may be overmolded around the tool body core 110 and heat pipes 105. Other assembly techniques are possible. In use, the wire rings 100 which act as susceptors 76, generate heat at the outer periphery of the tool body core 110, evenly throughout its length. The heat generated by the wire rings 100 is conducted through the tool body outer shell 111 and is absorbed by the heat pipes 105. The heat pipes 105 concentrate the heat at the outer corners of the tool body outer shell 111, in close proximity to the vertical adhesive bondlines 68 within the cells 58. Similar heat pipes 105 may be embedded within the outer shell 111 in order to locally concentrate heat in other areas of the cells 58, if desired.

Reference is now made to FIG. 17 which broadly illustrates the steps of a method of thermally curing a cell-based composite structure, such as a cell-based structural array 50 having adhesive bondlines 68, 70. At 112, susceptors 76 are installed in a plurality of tooling blocks 74. Depending upon the configuration of the susceptors 76, they may be inserted into tool bodies 75 either before or after the tooling blocks 74 are inserted into the cells 58 of the cell-based structural array 50. At 114, the tooling blocks 74 are inserted into cells 58 of the cell-based structural array 50, either individually by hand or in groups using a holding/transfer fixture (not shown). At 114, an induction coil 88 forming part of an electromagnet 86 generates an electromagnetic field 90 that extends substantially perpendicular to the rows 84 of tooling blocks 74. At 118 the susceptors 76 are inductively heated using the electromagnetic field 90. More specifically, the susceptors 76 absorb electromagnetic energy from the electromagnetic field 90, inducing the flow of electrical currents in the susceptors 76 that produce heat. At 120, the adhesive bondlines 68, 70 joining the cells 58 together are thermally cured using heat generated by the susceptors 76 and transferred through the tool bodies 75.

Embodiments of the disclosure may find use in a variety of potential applications, particularly in the transportation industry, including for example, aerospace, marine, automotive applications and other application where cell-based structural components such as a cell-based structural arrays are employed. Thus, referring now to FIGS. 18 and 19, embodiments of the disclosure may be used in the context of an aircraft manufacturing and service method 122 as shown in FIG. 18 and an aircraft 124 as shown in FIG. 19. Aircraft applications of the disclosed embodiments may include, for example, without limitation, composite cell cores used in composite sandwich structures, and RF apertures, to name only a few. During pre-production, exemplary method 122 may include specification and design 126 of the aircraft 124 and material procurement 128. During production, component and subassembly manufacturing 130 and system integration 132 of the aircraft 124 takes place. Thereafter, the aircraft 124 may go through certification and delivery 134 in order to be placed in service 136. While in service by a customer, the aircraft 124 is scheduled for routine maintenance and service 138, which may also include modification, reconfiguration, refurbishment, and so on.

Each of the processes of method 122 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 124 produced by exemplary method 122 may include an airframe 140 with a plurality of systems 142 and an interior 144. Examples of high-level systems 142 include one or more of a propulsion system 146, an electrical system 148, a hydraulic system 150, and an environmental system 152. Any number of other systems may be included. Although an aerospace example is shown, the principles of the disclosure may be applied to other industries, such as the marine and automotive industries.

Systems and methods embodied herein may be employed during any one or more of the stages of the production and service method 122. For example, components or subassemblies corresponding to production process 130 may be fabricated or manufactured in a manner similar to components or subassemblies produced while the aircraft 124 is in service. Also, one or more apparatus embodiments, method embodiments, or a combination thereof may be utilized during the production stages 130 and 132, for example, by substantially expediting assembly of or reducing the cost of an aircraft 124. Similarly, one or more of apparatus embodiments, method embodiments, or a combination thereof may be utilized while the aircraft 124 is in service, for example and without limitation, to maintenance and service 138.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus configured to heat at least one cell in a composite structure that comprises an array of cells, such that the apparatus comprises:
   an electromagnet that comprises an induction coil beneath the array of cells at a distance that centers an electromagnetic field through the array of cells;
   a bank of tooling blocks that comprises a susceptor, respectively, in each tooling block of the bank of tooling blocks, configured to:
   insert into the array of cells; and
   couple magnetically to the electromagnetic field, such that the susceptor comprises:
   a length perpendicular to a plane of orientation of the induction coil; and
   a hollow center that comprises an opening that faces away from the electromagnet.

2. The apparatus of claim 1, wherein each tooling block includes:
   a tool body formed of a material transparent to the electromagnetic field, and
   the susceptor is embedded within the tool body.

3. The apparatus of claim 2, wherein the susceptor is centrally located within the tool body.

4. The apparatus of claim 2, wherein the susceptor is a tube having circular cross-sectional shape.

5. The apparatus of claim 2, wherein the susceptor is a tube having a square cross-sectional shape.

6. An apparatus configured to heat at least one cell in a composite structure that comprises an array of cells, such that the apparatus comprises:
   an electromagnet that comprises an induction coil beneath the array of cells at a distance that centers an electromagnetic field through the array of cells;
   a bank of tooling blocks that comprises a susceptor, respectively, in each tooling block of the bank of tooling blocks, configured to:
   insert into the array of cells; and
   couple magnetically to the electromagnetic field, such that the susceptor comprises:
   a length perpendicular to a plane of orientation of the induction coil; and
   a hollow center that comprises an opening that faces away from the electromagnet,
   wherein each tooling block includes:
   a tool body formed of a material transparent to the electromagnetic field, and
   the susceptor is embedded within the tool body,
   wherein the susceptor comprises a shape that comprises a magnetic material having a Curie temperature greater than a cure temperature of a bondline adhesive of the array of cells.

7. The apparatus of claim 1, wherein the susceptor comprises a shape that comprises a magnetic material having a Curie temperature greater than a cure temperature of a bondline adhesive of the array of cells.

8. The apparatus of claim 3, wherein the susceptor is a tube having circular cross-sectional shape.

9. The apparatus of claim 3, wherein the susceptor is a tube having a square cross-sectional shape.

10. The apparatus of claim 6, wherein the susceptor is centrally located within the tool body.

11. The apparatus of claim 10, wherein the susceptor is a tube having circular cross-sectional shape.

12. The apparatus of claim 10, wherein the susceptor is a tube having a square cross-sectional shape.

13. The apparatus of claim 6, wherein the susceptor is a tube having circular cross-sectional shape.

14. The apparatus of claim 6, wherein the susceptor is a tube having a square cross-sectional shape.

15. An apparatus configured to heat an arrays of cells of a composite structure, the apparatus comprising:
   an electromagnet that comprises an induction coil beneath the array of cells at a distance that centers an electromagnetic field through the array of cells;
   a plurality of tooling blocks coupled to the electromagnet, each tooling block of the plurality of tooling blocks comprising a susceptor and an upper extension that is configured to facilitate installation and removal of the tooling blocks from the array of cells, the plurality of tooling blocks configured to:
   insert into the array of cells; and
   couple magnetically to the electromagnetic field,
   wherein the susceptor comprises:
      a length perpendicular to a plane of orientation of the induction coil; and
      a hollow center that comprises an opening that faces away from the electromagnet.

16. The apparatus of claim 15, wherein each tooling block includes:
   a tool body having a cross-sectional shape substantially matching that of each cell of the arrays of cells, wherein the tool body is formed of a material transparent to the electromagnetic field, and
   the susceptor is embedded within the tool body.

17. The apparatus of claim 16, wherein the susceptor is centrally located within the tool body.

18. The apparatus of claim 17, wherein the susceptor is a tube having circular cross-sectional shape.

19. The apparatus of claim 17, wherein the susceptor is a tube having a square cross-sectional shape.

20. The apparatus of claim 16, wherein the susceptor is a tube having circular cross-sectional shape.

21. The apparatus of claim 16, wherein the susceptor is a tube having a square cross-sectional shape.

22. The apparatus of claim 17, wherein the susceptor comprises a shape that comprises a magnetic material having a Curie temperature greater than a cure temperature of a bondline adhesive of the array of cells.

* * * * *